INVENTOR:
JOSEPH G. AYERS, JR,
BY
HIS ATTORNEY.

Feb. 15, 1927.

J. G. AYERS, JR 1,617,663

GAUGING MACHINE

Filed April 13, 1926

INVENTOR:
JOSEPH G. AYERS, JR.,
BY
HIS ATTORNEY.

Feb. 15, 1927.
J. G. AYERS, JR
1,617,663
GAUGING MACHINE
Filed April 13, 1926    4 Sheets-Sheet 4

INVENTOR:
JOSEPH G. AYERS, JR.,
BY
HIS ATTORNEY.

Patented Feb. 15, 1927.

1,617,663

UNITED STATES PATENT OFFICE.

JOSEPH G. AYERS, JR., OF MONTCLAIR, NEW JERSEY, ASSIGNOR TO GENERAL MOTORS CORPORATION, OF DETROIT, MICHIGAN, A CORPORATION OF DELAWARE.

GAUGING MACHINE.

Application filed April 13, 1926. Serial No. 101,669.

This invention relates to gauging machines and is herein shown, by way of example, as embodied in a machine for automatically gauging the diameters of cylindrical rollers.

An object of the invention is to provide a machine for rapidly and accurately gauging articles, such as cylinders, and segregating those of acceptable size from the others. Another object is to provide a simple machine for this purpose and one that is entirely automatic in action. Another object is to provide an improved gauging machine that can be readily adapted for detecting small dimensional differences in articles having a considerable range of sizes whether in length or diameter.

To these ends and to improve generally on machines of this general character, the invention also consists in the various matters hereinafter described and claimed.

In the drawings, Figure 1 is a side elevation with some parts removed and some in section.

Figure 1^A is a perspective view of certain details.

Figure 1:
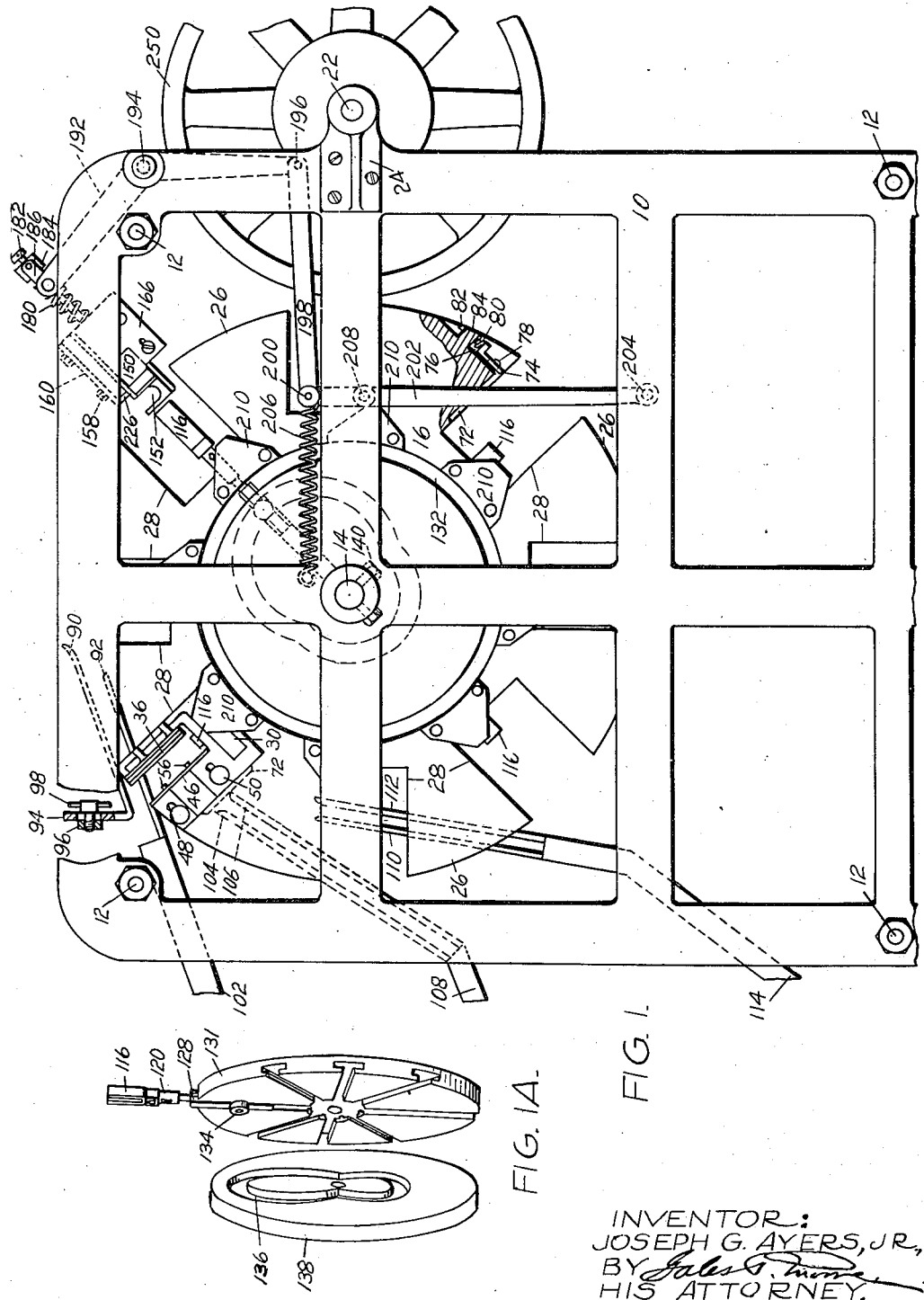
Figure 2:
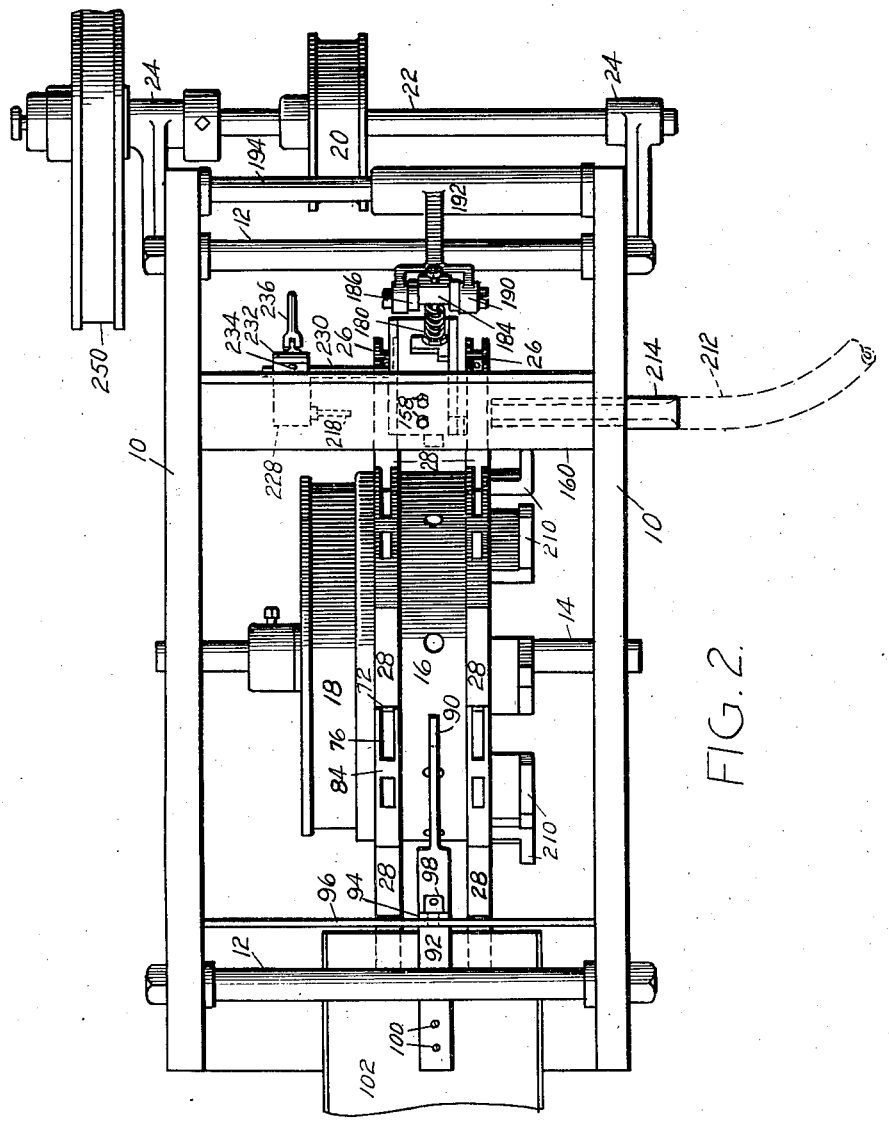
Figure 2 is a plan view with some parts removed.
Figure 3:
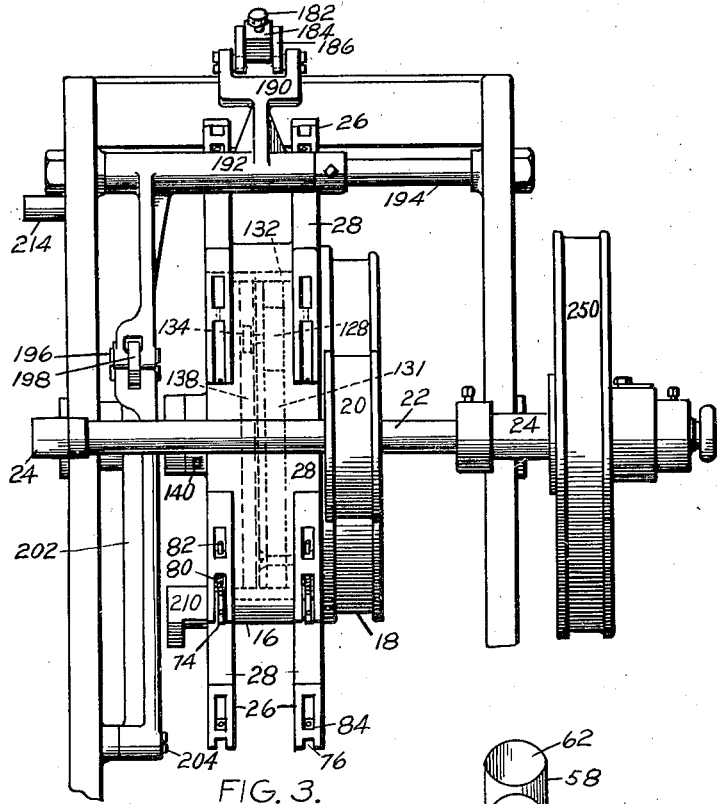
Figure 3 is an end view with some parts removed.
Figure 6:
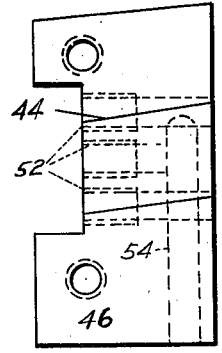
Figure 6 is an enlarged side view of one of the gauge blocks.
Figure 7:
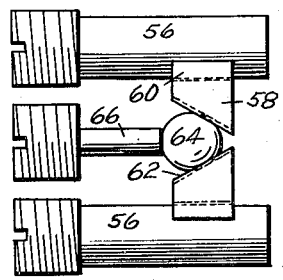
Figure 7 is an enlarged view of the gauge pins and their locking means detached from the gauge block.
Figure 8:
Figure 8 is a side view of a detail.
Figure 4:
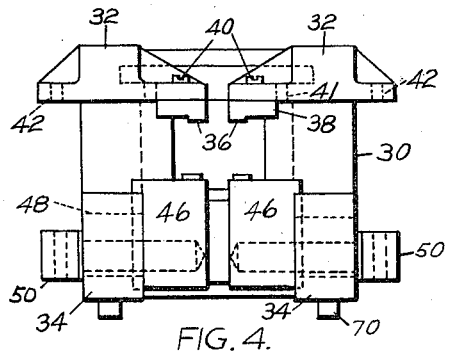
Figure 4 is an enlarged plan view of the gauge holder and associated parts.
Figure 5:
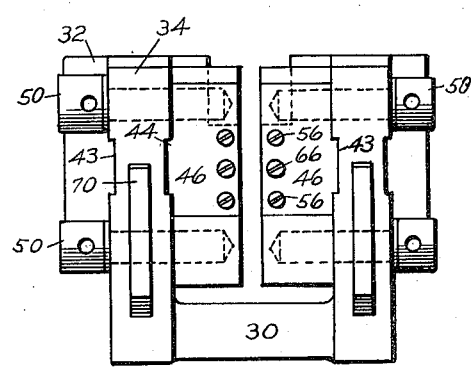
Figure 5 is an enlarged rear end view of the gauge holder and associate parts.
Figure 9:
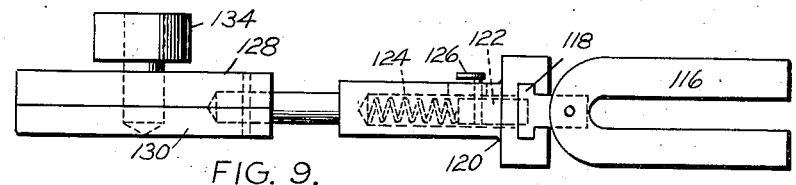
Figure 9 is a detached view of the magnet and associated mechanism.
Figure 10:
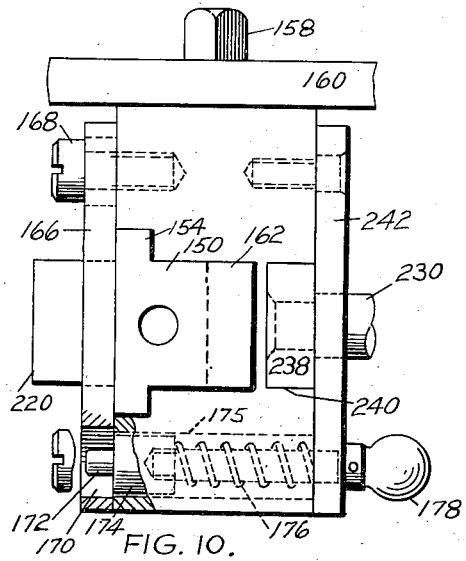
Figure 10 is a front view and Figure 11 is a top view of a portion of the mechanism for delivering articles to the magnet.
Figure 11:
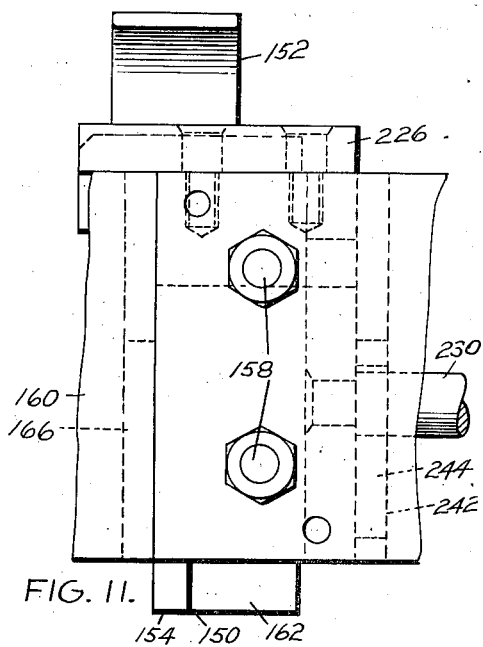
Figure 14:
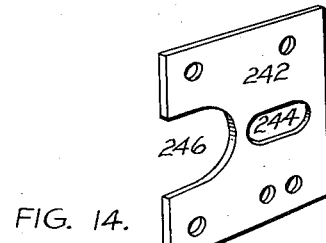
Figure 14 is a side view of a face plate for the other side of the slide block.
Figure 12:
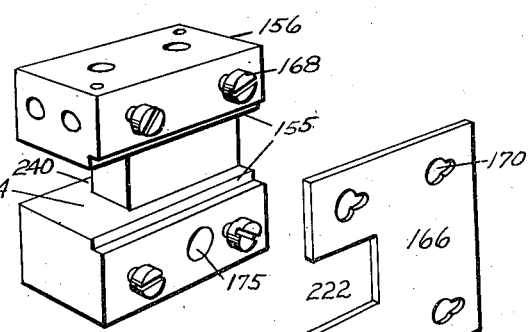
Figure 12 is a perspective view of a slide block.
Figure 13:
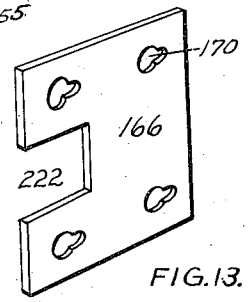
Figure 13 is a side view of a detachable gib plate for one side of the slide block.
Figure 15:
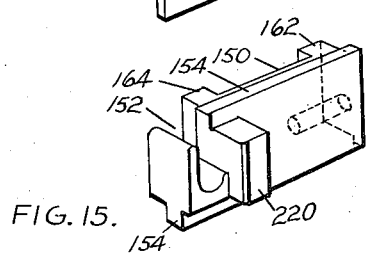
Figure 15 is a perspective view of an article receiving and delivering member which slides in the slide block.

In general, the machine operates by feeding articles one-by-one sidewise to gauging slots in a rotary carrier, the slots having gauging members arranged to allow the smaller articles to move nearer the center of the carrier. The articles are then stripped from the rotary carrier by stationary blades which terminate successively nearer the center of the carrier at different stations so that the articles are segregated in accordance with their sizes. The invention is described with particular reference to the gauging of diameters of cylindrical rollers but, in its broader aspects, it is not necessarily so limited.

The numeral 10 indicates right and left frame members connected and spaced by bars 12 and by a non-rotary central shaft 14. A carrier or drum 16 is rotarily mounted on the shaft and has an integral pulley 18 driven by a belt from a pulley 20 on a drive shaft 22 journalled in brackets 24 at the ends of the frame members. The carrier comprises a central drum portion with peripherally extended end flanges 26 having opposed radial gauge receiving slots 28.

In each pair of slots is secured a gauge holder 30 comprising a base portion with a front pair of spaced arms 32 and a rear pair of spaced arms 34. Each front arm carries a radially arranged gauge member in the form of a blade 36 having a flange 38 secured by screws 40. The front blades act in conjunction with other gauge members to be described and are spaced as indicated when gauging the diameters of short articles. For longer articles, they are placed further apart either by exchanging right and left blades at the position shown or by fastening them with the screws 40 set in other openings 41 or 42 nearer the outer edges of the arms 32. The rear arms 34 have grooves 43 at both sides to receive ribs 44 on gauge blocks 46 and are slotted as at 48 to receive clamping screws 50. The grooves 43, ribs 44 and slots 48 are inclined slightly and the gauge blocks can be adjusted bodily towards or from the gauge blades 36 as when different sizes of rollers are to be gauged.

Each gauge block 46 has three parallel bores 52 with an intersecting bore 54 at right angles thereto. In the outermost parallel bores are inserted gauge pins 56 each having a threaded head engaging a tapped portion at the rear end of its bore so that it can be longitudinally adjusted. For clamping the gauge pins, two locking members 58 are inserted in the bore 54 each locking member having a curved end portion 60 fitting the pins and a bevelled portion 62 engaged by a ball 64 in the central opening. To spread the locking members to clamp the gauge pins, the ball is engaged by the end of a locking pin 66 having a head threaded in a tapped portion at the rear of the central bore.

The gauge blocks 46 are shown attached at the inside of the rear arms, as for gauging the diameter or thickness of short articles, but they can be reversed and attached at the outer sides of the rear arms for gauging the diameter or thickness of long articles; the gauge pins then come opposite the gauge blades 36 when the latter are also spaced further apart. Long articles can also be gauged near the middle when the gauge members are close together. For articles of an intermediate length, gauge blocks similar to blocks 46 but thinner laterally are clamped to the rear arms on either side thereof. The two lower gauge pins are intended to be adjusted with their end gauging surfaces a little closer to the gauge blades 36 than the end gauging surfaces of the two upper gauge pins. The upper gauge pins allow only small articles (small in diameter or thickness) and those of acceptable size to pass towards the bottom of the slot while the lower gauge pins allow only articles that are too small (in diameter or thickness) to pass while those of acceptable size are retained temporarily.

Each gauge holder 30 has locking ribs 70 on the rear arms which enter grooves 72 in the carrier flanges 26. Sliding latches 74 in recesses 76 of the carrier flanges engage the end faces of the ribs to lock the holder in the gauge slot. Each latch 74 comprises a slotted angle plate guided by a screw 78 and pressed to locking position by a coil spring 80. Each latch is further guided by a connected pin 82 which slides in a hole of a lug 84 in the flange recess 76.

The articles that are pulled radially inwardly in the gauge slots as far as they will go by the magnet mechanism to be described are stripped from the gauges and segregated in accordance with their diameter or thickness. The larger articles are stripped from the carrier by narrow stripper blades 90 and 92 which extend between the flanges of the carrier near the top of the frame. The blades embrace the central portion of the larger articles and the rotation of the carrier causes the articles to be stripped off substantially tangentially. The blade 90 has a slotted vertical flanges 94 attached to a cross piece 96 by a hand screw 98 and the blade 92 is fastened to a cross brace by screws 100. The larger articles are conducted by the stripper blades to an upper chute 102. Articles of acceptable size are removed by stripper blades 104 and 106 which terminate nearer to the center of the carrier at a different station and direct the articles into a chute 108. The articles that are too small are removed by stripper blades 110 and 112 which terminate still nearer the center of the carrier at still another station and nearer the bottom of the gauge slots and direct the articles to a bottom chute 114. The blades are springy and are arranged in pairs with their ends bevelled to direct articles between them. The outer blade of each pair, which is preferred but not essential, is removably and adjustably secured by a hand screw so that the blades can be properly spaced. The inner blade of one pair terminates in the same circle as the outer blade of the succeeding pair so that all the articles must be removed by some of the strippers. Articles that project beyond the side flanges of the carrier could be removed by pairs of blades outside the flangse but it is preferable to have the blades at the middle so that any articles that are tilted in the gauges by reason of slight differences in diameter at the ends will go to the chute that represents their average size, or will stop the carrier until such unduly tapered articles are removed.

When an article is delivered to a guage slot, it is pulled radially inwardly as far as it will go by a magnet 116 which preferably reciprocates in the slot. Each magnet is so mounted as to be readily detachable for energizing and for this purpose has a T-shaped base 118 to engage a corresponding groove in a holder 120. Each holder carries a slidable latch pin 122 arranged to slide into a latch opening in the base of the magnet. A coil spring 124 presses the pin to latching position and a projecting lug 126 enables the latch pin to be retracted. The holder 120 passes through a hole in the carrier and is pinned to a reciprocating slide 128 having side ribs 130 which slide in a radial groove in a guide plate 131 fastened by screws in a circular recess 132 in the carrier. The slide has a cam roller 134 engaging a cam groove 136 in the face of a cam disc 138 the hub of which is rigidly secured by a set screw 140 to the non-rotary shaft 14. Thus rotation of the carrier causes the magnets to reciprocate in the gauge slots and to carry an article from the hereinafter described delivering mechanism to the gauge members.

The mechanism which delivers the articles one-by-one into the gauge slot and to the magnet comprises a slidable member 150 having an article receiving recess or hook 152 near one end and upper and lower guide ribs 154 for guiding it in guideways 155 of a guide block 156 which is fastened by screws 158 under a cross plate 160 on the frame. The slidable hooked member 150 has end flanges 162 and 164 to limit its sliding and is held in the guide block by a quick-detachable gib plate 166 fastened by headed screws 168 engaging bayonet slots 170 in the gib plate. The gib plate is locked in a position where the headed screws are in the restricted portions of the bayonet slots by a short projection 172 on a latch pin 174 which slides in a bore 175 of the guide block and is pressed to locking position by a coil spring 176. The latch pin is retracted by a knob 178. For gauging articles differing much in diameter from those under test, a member similar to the member 150 but having a different sized article recess is substituted for the one shown.

The member 150 is actuated yieldingly through a coil spring 180 surrounding a rod 182 attached to the member and slidable (under excessive pressure) through a block 184 which is pivotally connected by links 186 to a fork 190 at the end of a rocking lever 192. The lever is pivotally mounted on the frame on a shaft 194 and its lower arm is pivoted at 196 to a link 198 pivoted at 200 to the upper end of an arm 202 which is pivoted at 204 to the frame. A coil spring 206 pulls a roller 208 on the arm 202 towards a series of cams 210 fastened to the side of the rotary carrier, one cam being near each gauge slot so that one article is delivered into each slot at each revolution of the carrier.

The articles are fed endwise in a stream by any suitable feeder (not shown) having an inclined outlet pipe 212 which conducts the articles to a tube 214 clamped in a bracket (not shown) at one end of the cross plate 160. The tube is so located as to lie in alignment with the article receiving recess 152 of the slidable member 150 when the latter is at the outer end of its stroke and the articles are pushed through the tube by the pressure of the stream of articles in the inclined pipe 212. Tube 214 has an eccentric terminal portion outside the frame and is rotatively adjustable to facilitate its alignment with pipe 212. The endmost article in the stream moves axially into the article receiving recess 152 until stopped by an adjustable stop pin 218. When this endmost article is carried sidewise by the inward stroke of the slidable member 150, the next article in the stream is temporarily retained in the tube 214 by engagement with a shoulder or face 220 on the side of the member 150. This shoulder retains the stream until the article recess is again brought into line with the tube. If the articles are quite short, a new member 150 having a lower shoulder 220 or none at all is substituted. The gib plate 166 and the guide block 156 are suitably cut out at their ends as at 222 and 224 to allow the endmost article to slide into the article recess 152 and against the stop pin 218. An end plate 226 is secured to the block 156 above the cut-out portions and holds the endmost article in the recess 152 when the member 150 begins its inward strike.

The stop pin 218 is fastened to a holder 228 which can be slidably adjusted on a shaft 230, the holder having a split bearing 232 and a clamp screw 234 operated by a pivoted handle 236. The holder is adjusted in accordance with the length of the articles, the stop pin being so located that the endmost article will temporarily hold the next one clear of the shoulder 220. The shaft 230 is adjustable laterally so that the stop pin can be moved into or out of alignment with the tube 214, being supported by a slide 238 movable in a guideway 240 of the block 156. The slide 238 is retained by a face plate 242 having a slot 244 for the shaft 230 to slide in. The inner end of plate 242 is also cut out as at 246 to allow the articles to feed through to the stop pin. The drive shaft 22 supports a continuously driven pulley 250 which can be clutched to the shaft or allowed to idle to stop the machine.

In operation, a stream of rollers or other articles in the inclined pipe 212 is forced through the tube 214 and one-by-one they slide into the recess 152 in the member 150 as the latter reciprocates. The member 150 carries the article a little way down one of the gauge slots and the magnet 116, which rotates with the carrier and reciprocates therein, lifts the article from the member 150 and draws it down against the gauge members as far as it will go. One or the other pairs of stripper blades then removes the article depending on its size and its position in the gauge members. The magnets successively come into action so that a number of articles are undergoing test at the same time.

I claim:

1. In a machine of the character described, a carrier having a gauging slot, mechanism supported on the carrier for moving articles successively into the slot, and means for expelling the articles at different points in accordance with the sizes of the articles; substantially as described.

2. In a machine of the character described, a rotary carrier having a series of gauging slots, mechanism actuated by the rotation of the carrier for moving articles successively into the slots, and means for stripping the articles from the slots and segregating them in accordance with their sizes; substantially as described.

3. In a machine of the character described, a carrier having end flanges with gauging slots therein, mechanism for moving articles successively into the slots, and stripper blades projecting between the flanges of the carrier for removing the articles in accordance with their sizes; substantially as described.

4. In a machine of the character described, a carrier having a gauging slot, a magnet for moving articles successively into the slot, and a series of stripper blades terminating at progressively increasing distances from the entrance to the slot for intercepting the articles at different points; substantially as described.

5. In a machine of the character described, a rotary carrier having a series of gauging slots, a series of magnets for moving articles successively into the slots, and a series of stripper blades spaced about the carrier and terminating at different distances from the periphery thereof; substantially a described.

6. In a machine of the character described, a carrier having a gauging slot, a gauge blade at one side of the slot, a series of gauge pins at the other side of the slot and arranged successively closer to the gauge blade, mechanism for moving articles successively into the slot, and stripper blades terminating at increasing distances from the entrance to the slot for removing and segregating the articles in accordance with their sizes; substantially as described.

7. In a machine of the character described, a carrier having a gauging slot with spaced gauge blades at one side thereof, sets of spaced gauge pins at the other side of the slot, the sets of pins terminating successively nearer to the straight blades, and stripper blades for removing articles from the gauging members at different points; substantially as described.

8. In a machine of the character described, a carrier having a slot, a gauge holder fixed in the slot and having a straight blade at one side of the slot, gauge pins adjustably mounted at the other side of the slot and terminating successively nearer to the straight blade, and sets of stripper blades terminating at different distances from the entrance to the slot; substantially as described.

9. In a machine of the character described, a rotary carrier having end flanges with radial slots, gauge members fixed at the sides of the slots and forming an article receiving passage of decreasing size, and stripper blades extending between the flanges, said stripper blades terminating at increasing distances from the entrances to the slots; substantially as described.

10. In a machine of the character described, a carrier having a gauging slot, a magnet reciprocating in the slot, means for presenting articles successively to the magnet, and means for stripping the articles from the slot in accordance with their sizes; substantially as described.

11. In a machine of the character described, a carrier having a gauging slot, a magnet reciprocating in the slot, means for presenting articles successively to the magnet, and a series of stripper blades for intercepting articles in the slot of the carrier; substantially as described.

12. In a machine of the character described, a rotary carrier having a series of gauging slots, magnets reciprocating in the slots, means for successively presenting articles to the magnets at one station, and means for stripping the articles at other stations in accordance with their sizes; substantially as described.

13. In a machine of the character described, a member having a gauging slot, a magnet reciprocating in the slot, means for presenting articles successively to the magnet, a plurality of stripper blades having their ends at progressively increasing distances from the entrance to the slot, and means for causing a relative movement of the stripper blades and the member to expel the articles in accordance with their sizes; substantially as described;

14. In a machine of the character described, a rotary carrier having gauging means, reciprocating mechanism for moving articles successively to the gauging means, and means operated by the rotation of the carrier for reciprocating said moving means; substantially as described.

15. In a machine of the character described, a rotary carrier having gauging means, mechanism on the carrier for moving articles successively to the gauging means, a cam fixed against rotation, and a connection between the cam and the moving mechanism for actuating the latter during the rotation of the carrier; substantially as described.

16. In a machine of the character described, a rotary carrier having a series of gauging slots, magnets reciprocable in the slots, a cam fixed against rotation, and connections between the cam and the magnets for reciprocating the latter during the rotation of the carrier; substantially as described.

17. In a machine of the character described, a member having a series of gauging slots, magnets reciprocable in the slots, a cam, connections between the cam and the magnets, and means for causing a relative movement of the cam and member for reciprocating the magnets; substantially as described.

18. In a machine of the character described, a rotary carrier having gauging means, mechanism for delivering articles successively to the periphery of the carrier, and a cam fixed to the carrier for actuating the delivering mechanism during rotation of the carrier; substantially as described.

19. In a machine of the character described, a rotary carrier having gauging means, means for pressing articles against the gauging means, mechanism for delivering articles successively to the pressing means, and a cam fixed to the carrier for actuating the delivering mechanism; substantially as described.

20. In a machine of the character described, a rotary carrier having gauging means, means for moving articles to the gauging means, mechanism for delivering articles successively to the moving means, and means operated by the rotation of the carrier for actuating the moving means and the delivering mechanism; substantially as described.

21. In a gauging machine, a gauge holder having pairs of spaced arms, means for attaching gauge members at different distances apart to one pair of arms, and means for attaching gauge members at corresponding distances apart to the other pair of arms; substantially as described.

22. In a gauging machine, a gauge holder having a pair of spaced arms, a pair of gauge blocks arranged for clamping engagement with the inner faces or the outer faces of the spaced arms, and article gauging members carried by the blocks; substantially as described.

23. In a gauging machine, a gauge holder having a pair of spaced arms, a pair of gauge blocks having tongue and groove engagement with the inner faces or the outer faces of the spaced arms, and gauge pins carried by the blocks; substantially as described.

24. In a gauging machine, a gauge holder having a pair of spaced arms, a pair of gauge blocks having tongue and groove engagement with the inner faces or the outer faces of the spaced arms, means for clamping the blocks to the arms, and a pair of gauge pins adjustably carried by each block; substantially as described.

25. In a gauging machine, a gauge holder having a pair of spaced arms, a pair of gauge blades, and means for clamping the gauge blades close together or further apart on the arms; substantially as described.

26. In a gauging machine, a gauge block having a plurality of parallel bores, gauge pins adjustable endwise in the outermost bores, and a locking pin in the central bore to effect locking of the gauge pins in adjusted positions; substantially as described.

27. In a gauging machine, a gauge block having a plurality of parallel bores, gauge pins adjustable endwise in the outermost bores, a locking pin in the central bore, said gauge block having a bore intersecting the parallel bores, locking members in said intersecting bore and engaging the gauge pins, and means engaged by the locking pin for operating said locking members; substantially as described.

28. In a gauging machine, a gauge holder having front and rear pairs of spaced arms, a pair of gauge blades, a pair of gauge blocks, means for clamping the gauge blades close together or further apart to one pair of arms, and means for clamping the gauge blocks to the other pair of arms at corresponding distances apart; substantially as described.

29. In a gauging machine, a rotary carrier having spaced end flanges with opposed slots, a gauge holder having front and rear arms fitting in the slot of each flange, and front and rear gauge members carried by the arms; substantially as described.

30. In a gauging machine, a rotary carrier having spaced end flanges with opposed slots, a gauge holder fitting in said slots and comprising a front pair of spaced arms and a rear pair of spaced arms, and spaced apart gauge members carried by the arms; substantially as described.

31. In a gauging machine, a rotary carrier having a slot in its periphery, a gauge holder fitting in said slot, gauge members carried by said holder, and means for detachably securing the gauge holder in the slot of the carrier; substantially as described.

32. In a gauging machine, a rotary carrier having spaced end flanges with opposed slots, said flanges having grooves communicating with one side of each slot, a gauge holder fitting in said slots and having ribs entering said grooves, and means carried by said flanges for engaging and locking said ribs in the grooves; substantially as described.

33. In a gauging machine, a rotary carrier having gauge slots, radial guideways in the carrier, magnets movable radially in said slots, slides connected to said magnets and movable in said guideways, and a cam for moving the slides and magnets; substantially as described.

34. In a gauging machine, a rotary carrier having gauge slots and a central recess, a guide plate secured to the carrier in the recess and having radial guideways, magnets movable radially in said slots, slides connected to said magnets and slidable in the guideways, and a cam in the recess for actuating the slides; substantially as described.

35. In a gauging machine, a rotary carrier having gauge slots, radial guideways in the carrier, magnets movable radially in said slots, slides movable in said guideways, and quick detachable connections between the magnets and the slides; substantially as described.

36. In a gauging machine, a rotary carrier having gauge slots, magnets movable radially in said slots, slides movable radially of said carrier, and having grooved heads, headed members on said magnets for engaging said grooved heads, and locking pins carried by said slides for detachably locking said heads and headed members in engagement; substantially as described.

37. In a gauging machine, a carrier having a gauge slot, and means for delivering articles to the slot comprising a guide, a member movable in the guide and having an article receiving recess near one end, a tube leading to said member, and means for moving the member to carry said recess into and out of alignment with the tube; substantially as described.

38. In a gauging machine, a carrier having a gauge slot, and means for delivering articles to the slot comprising a guide, a member movable in the guide and having an article receiving recess near one end, a tube leading to said recess, an article stop on the opposite side of the member from the tube, and means for moving the member to carry an article into the gauge slot from a position in line with the tube; substantially as described.

39. In a gauging machine, a rotary carrier having a radial gauge slot, and means for delivering articles to the slot comprising a radial guide, a member slidable in the guide and having an article receiving recess near one end, a tube leading to said recess, and means actuated by the rotation of the carrier for reciprocating said member to carry an article into the gauge slot from a position in line with the tube; substantially as described.

40. In a gauging machine, a carrier having a gauge slot, and means for delivering articles to the slot comprising a guide, a member movable in the guide and having an article receiving recess near one end, a tube leading to said recess, a rock lever, and a yielding connection between said rock lever and said article receiving member to yieldingly carry an article into the gauge slot; substantially as described.

41. In a gauging machine, a carrier having a gauge slot, and means for delivering articles to the slot comprising a guide, a member movable in the guide and having an article receiving recess near one end, a tube leading to said recess, a rock lever, a block actuated by the lever, a rod connected to said member and slidable in the block, and a spring between the member and the block; substantially as described.

42. In a gauging machine, a carrier having a gauge slot, and means for delivering articles to the slot comprising a guide, a member movable in the guide and having an article receiving recess near one end, a tube leading to said recess, a rock lever, connections between the lever and the member, a cam on the carrier, and means actuated by the cam for rocking the lever; substantially as described.

In testimony whereof I hereunto affix my signature.

JOSEPH G. AYERS, Jr.